United States Patent
Bergman (10) Patent No.: US 8,105,400 B2
(45) Date of Patent: Jan. 31, 2012

(54) PROCESS AND DEVICE FOR TREATING BIOMASS

(75) Inventor: Peter Christiaan Albert Bergman, Schagen (NL)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 678 days.

(21) Appl. No.: 12/160,106

(22) PCT Filed: Jan. 8, 2007

(86) PCT No.: PCT/NL2007/050003
§ 371 (c)(1),
(2), (4) Date: Nov. 13, 2008

(87) PCT Pub. No.: WO2007/078199
PCT Pub. Date: Jul. 12, 2007

(65) Prior Publication Data
US 2009/0084029 A1    Apr. 2, 2009

(30) Foreign Application Priority Data
Jan. 6, 2006    (NL) ..................................... 1030864

(51) Int. Cl.
*C10L 5/00*    (2006.01)
*F28D 7/00*    (2006.01)

(52) U.S. Cl. ............. 44/605; 44/606; 44/629; 202/118; 202/137; 422/201; 422/233; 422/235

(58) Field of Classification Search ................... 202/118, 202/137, 156; 48/197 R, 111, 119; 110/213; 44/106, 605, 606, 629; 422/233, 235, 201; 585/240, 242
See application file for complete search history.

(56) References Cited

U.S. PATENT DOCUMENTS

| | | | | |
|---|---|---|---|---|
| 4,177,740 A | * | 12/1979 | Lamb et al. | 110/213 |
| 4,553,978 A | * | 11/1985 | Yvan | 44/280 |
| 4,787,917 A | * | 11/1988 | Leclerc de Bussy | 44/606 |
| 4,954,620 A | * | 9/1990 | Bourgeois | 536/56 |
| 5,993,751 A | * | 11/1999 | Moriarty et al. | 422/233 |

(Continued)

FOREIGN PATENT DOCUMENTS
BE    444 413    3/1942

(Continued)

OTHER PUBLICATIONS

Machine Translation EP 038513, Sep. 21, 2010.*

(Continued)

*Primary Examiner* — Nina Bhat
(74) *Attorney, Agent, or Firm* — Young & Thompson (57) ABSTRACT

A process for treating biomass comprises providing a material that contains an amount of residual moisture. The material is heated to a torrefying temperature in a low-oxygen atmosphere in a torrefaction reactor to convert it into a torrefied material. The material with the contained residual moisture is essentially fully dried in a drying chamber by evaporation of residual moisture. The torrefaction reactor comprises a torrefying chamber, in which the torrefaction of this dried material is essentially carried out. The material is conveyed through the torrefaction reactor. The drying of the material in the drying chamber is carried out by introducing into it a hot drying gas that flows therethrough cocurrently with the material. The torrefaction of the material in the torrefying chamber of the torrefaction reactor is carried out by introducing into it a hot torrefying gas that flows through the torrefying chamber countercurrently with the material.

18 Claims, 4 Drawing Sheets

U.S. PATENT DOCUMENTS

2003/0221363 A1* 12/2003 Reed .............................. 44/594
2007/0094929 A1* 5/2007 Kang et al. ..................... 48/111

FOREIGN PATENT DOCUMENTS

| DE | 30 41 627 |   | 6/1982 |
|----|-----------|---|--------|
| DE | 32 11 590 |   | 10/1983 |
| EP | 0 385 514 | * | 9/1990 |
| FR | 2 624 876 |   | 6/1989 |
| WO | 2005/056723 | * | 6/2005 |

OTHER PUBLICATIONS

P.C.A. Bergman et al., "Torrefaction for biomass co-firing in existing coal-fired power stations—BIOCOAL", ECN BIOMASS, Jul. 2005, ECN-C—05-013, Retrieved from Internet URL: http://www.ecn.nl/docs/library/report/2005/c05013.pdf on Jun. 4, 2009.

P.C.A. Bergman, "Combined torrefaction and pelletisation—The TOP process", ECN BIOMASS, Jul. 2005, ECN-C—05-073, Retrieved from Internet URL: http://www.ecn.nl/docs/library/report/2005/C05073.pdf on Jun. 4, 2009.

Edward S. Lipinsky et al., "Enhanced Wood Fuels Via Torrefaction", Fuel Chemistry Division Preprints, 2002, vol. 47, No. 1, Retrieved from Internet URL: http://www.techtp.com/recent%20papers/acs_paper.pdf on Jun. 4, 2009.

International Search Report, dated Mar. 30, 2007 and issued in corresponding International Application No. PCT/NL2007/050003.

* cited by examiner

PROCESS AND DEVICE FOR TREATING BIOMASS

The invention relates to a process for treating a material, such as biomass or waste, comprising:
the provision of a material that contains an amount of residual moisture,
the provision of a torrefaction reactor,
the heating of the material in the torrefaction reactor to a torrefying temperature in a low-oxygen atmosphere in the torrefaction reactor, wherein the material is converted into a torrefied material.

The term "material" or "raw material" is used here to denote various kinds of materials or raw materials. In this patent application the term "material" or "raw material" refers not only to biomass or waste, but also any organic material. Because the material contains carbon it is generally combustible. The material can be derived e.g. from (agricultural) residues or waste.

Such a process is known. In the untreated state, many materials are relatively wet. The material generally contains free (unbound) and (loosely) bound water. The bound or loosely bound water is absorbed by the natural raw material itself. For example, biomass of plant origin, such as prunings and mown grass, contains a considerable amount of moisture by nature.

Furthermore, biomass can be very wet as a result of washing it or subjecting it to an alternative water treatment in order to reduce the salt content of the biomass. The removal of salts is desirable, because salts in biomass used as a fuel lead more quickly to corrosion formation in the combustion chamber of a power station. These salts also reduce the quality of the ash produced during combustion of the biomass fuel, which hampers the utilization of this ash. Water-soluble salts can in particular be washed out of biomass of plant origin, such as straw.

The raw material usually has a moisture content of 5-15%, i.e. an amount of residual moisture is contained in the material. This material with the residual moisture is introduced into the torrefaction reactor. Torrefaction is a thermochemical treatment method for material. In this method the material is heated in a low-oxygen (with substoichiometric quantities of oxygen) or oxygen-free gaseous atmosphere, usually under atmospheric pressure to a temperature of 200-320° C. The lack of oxygen prevents the material from burning. Instead the material is torrefied, which leads to loss of mass because of the elimination of gases. This loss of mass generally amounts to about 30%, while the energy value is only reduced by 10%. The fuel produced by torrefaction therefore has a higher calorific value.

Torrefaction also causes chemical changes to the structure of the material. The material loses its mechanical strength and elasticity, so it is much easier to grind. Furthermore, torrefied material is hydrophobic, and it therefore stays dry and is insensitive to atmospheric humidity. The risk of rotting and overheating is very small when the material which has been produced by torrefaction is stored.

The temperature of the material is raised in the torrefaction reactor. Before torrefaction of the material can take place, the residual moisture must, however, first be evaporated from the material. The material is virtually completely dried in the torrefaction reactor by evaporating the residual moisture. The actual torrefaction of the material only takes place after the residual moisture has been evaporated. Torrefaction begins as soon as the temperature of the material then exceeds about 200° C. The torrefying temperature is, however, generally higher, being about 250° C.

A considerable amount of steam is generated in the torrefaction reactor when the residual moisture is evaporated in the torrefaction reactor. This can lead to a relatively fast-moving gas stream flowing in the reactor, which increases the pressure drop over the reactor. Furthermore, the energy needed for evaporating the residual moisture is much greater than the energy required for torrefaction. In particular, in a torrefaction reactor based on direct contact between the gas and the material, a relatively large amount of hot gas must be introduced into the torrefaction reactor at a high inlet temperature, which further increases the amount of gas that has to pass through the torrefaction reactor. This hampers the implementation of the method of treatment.

An object of the invention is to provide an improved process for treating material.

This object is achieved according to the invention in that the torrefaction reactor comprises a drying chamber and a torrefying chamber, the material with the residual moisture contained in it being essentially fully dried in the drying chamber by evaporation of the residual moisture, and the torrefaction of the dried material being essentially carried out in the torrefying chamber, and the material being conveyed through the torrefaction reactor in a transport direction, and the drying of the material in the drying chamber being carried out by introducing into it a hot drying gas that flows through the drying chamber in co-current with the material, and the torrefaction of the material in the torrefying chamber of the torrefaction reactor being carried out by introducing into it a hot torrefying gas that flows through the torrefying chamber of the torrefaction reactor in counter-current to the material.

According to the invention, the material is dried in the drying chamber, after which the material is torrefied in the torrefying chamber. The drying chamber and the torrefying chamber form two separate spaces here. Unlike in the known process, the evaporation of residual moisture from the material and the torrefaction of the material according to the invention therefore form two separate stages, each of which can be optimized.

The material is almost fully dried in the drying chamber, which requires a relatively large amount of energy. The evaporation of residual moisture from the material is efficient, because the material and the hot gas move in co-current with each other. The drying chamber is designed specifically for the drying of the material.

When a hot gas is introduced, which is e.g. in direct contact with the material, the temperature of the material in the torrefaction reactor rises to a torrefying temperature. Since this hot gas flows in counter-current to the material, the temperature of the hot gas "follows" the temperature of the material. The temperature of the material and the temperature of the hot gas both increase in the transport direction of the material. The inlet temperature of the hot gas then needs only be somewhat above the temperature of the material at the outlet. There is only a very small risk of "hot spots" developing in the dry material, or of uncontrolled torrefaction or pyrolysis taking place. Only a relatively small amount of energy needs to be introduced into the torrefying chamber, which allows for an improved dosing and/or fine tuning of the energy input. As a result, the torrefying temperature in the torrefying chamber can be set and controlled accurately.

A further advantage of the invention is that the required temperatures of the hot gases introduced—drying gas and torrefying gas—are relatively low. This facilitates the production of these hot gases. For example, the temperature of the hot gas introduced into the torrefying chamber is in the range of 200-400° C., being e.g. about 300° C. Controlled torrefaction can be carried out in the torrefying chamber at such a temperature. In addition the temperature of the hot gas introduced into the drying chamber can be in the range of 150-600° C., being e.g. about 350° C. This temperature is particularly suitable for the almost complete drying of the material, such as to a moisture content of ≦3%. These temperatures are sufficiently low for the production using e.g. a thermal oil.

When the drying chamber and the torrefying chamber are accommodated in the torrefaction reactor, the drying chamber and the torrefying chamber form two reaction spaces of the torrefaction reactor. The drying of the material by evaporation of the residual moisture is essentially carried out in the first reaction space, i.e. the drying chamber, and the torrefaction of the material is essentially carried out in the second reaction space, i.e. the torrefying chamber. The material is in fact almost completely dried here by evaporation of the residual moisture in the torrefaction reactor, but the process in the torrefaction reactor is separated according to the invention into two stages, each of which can be optimized.

However, it is also possible according to the invention to house the drying chamber in a residual-moisture dryer, and to house the torrefying chamber in the torrefaction reactor. In this case, the residual-moisture dryer forms a separate device, which is housed separately from the torrefaction reactor. The residual-moisture dryer can be so designed as to ensure the efficient evaporation of the residual moisture from the material. The residual-moisture dryer is connected with the torrefaction reactor for the transfer of the almost fully dried material from the residual-moisture dryer into the torrefying chamber.

It is possible according to the invention for the drying gas, after it has moved in co-current with the material and has thus been cooled to leave the drying chamber and to be introduced into a first heat exchanger, which heats up this drying gas, after which the drying gas heated up by the first heat exchanger is introduced into the drying chamber, and the torrefying gas after it has moved in counter-current to the material and has thus been cooled down leaving the torrefying chamber and being introduced into a second heat exchanger, which heats up this torrefying gas, after which the torrefying gas that has been heated up by the second heat exchanger is introduced into the torrefying chamber. In this case, the drying gas circulates in a first circuit, while the torrefying gas circulates in a second circuit. By using two circuits, each with its own heat exchanger, it is possible to ensure an efficient energy recovery from the drying gas and the torrefying gas.

In particular, the provision of the material by the process according to the invention comprises introducing a relatively wet raw material into a dryer, and heating the material in the dryer to evaporate moisture from the material until the amount of residual moisture stays in it, the material that has been dried in the dryer being introduced into the drying chamber. The relatively wet material has a moisture content of e.g. more than 15%. The relatively wet material can then be thermally dried in a dryer, such as a rotating-drum dryer before being introduced into the drying chamber of the torrefaction reactor or the residual-moisture dryer. As the material is warmed in the dryer, the temperature rises sufficiently to evaporate moisture from the material. The material is not fully dried in the dryer, i.e. an amount of residual moisture is left in the material. The residual moisture is mainly formed by bound water in the material. In practice, energy is introduced into the dryer until the moisture content of the material is about 10-15%. The biomass is then 85-90% dry. Reducing the moisture content in the dryer further would reduce the yield of the whole treatment method. For example, the dryer is not suitable for drying the material further in an economically efficient manner.

Incidentally, material with a moisture content higher than 15% can of course also be fed into the torrefaction reactor without preliminary drying or pre-drying in a separate dryer. For example, straw generally has a moisture content of about 20%. This straw can be directly fed into the torrefaction reactor according to the invention without preliminary drying. The drying of that straw then takes place completely in the drying chamber of the torrefaction reactor according to the invention. Conversely, it may sometimes be desirable first to pre-dry in the dryer material that only contains a relatively small amount of moisture, such as 5% or less.

The material according to the invention should preferably contain solid particles that are passed through the torrefaction reactor in the form of a packed moving bed. In this case the torrefaction reactor is operated on the principle of moving-bed technology.

The invention also relates to a device for treating material, comprising a torrefaction reactor, to which material can be fed which contains an amount of residual moisture, which torrefaction reactor is provided with an inlet for introducing this material into the torrefaction reactor, heating means for heating the material in the torrefaction reactor to a torrefying temperature, air-treating means for creating a low-oxygen environment (with substoichiometric quantities of oxygen) in the torrefaction reactor wherein the material can be converted into torrefied material during operation, and an outlet for removing torrefied material.

According to the invention, the torrefaction reactor comprises a drying chamber and a torrefying chamber, which drying chamber is adapted for the essentially complete drying of the material by evaporating the residual moisture and which torrefying chamber is adapted for torrefying the material, and wherein the torrefying chamber is located downstream of the drying chamber when viewed in the direction of flow of the material, and wherein the drying chamber has at least one inlet orifice for drying gas and at least one outlet orifice for the said drying gas and any gas and/or vapour formed during evaporation of residual moisture, which inlet orifice for drying gas is located at the end of the drying chamber that faces the inlet and the outlet orifice is located at the opposite end of the drying chamber, and wherein the torrefying chamber has at least one inlet orifice for torrefying gas and at least one outlet orifice for said torrefying gas and torrefaction gas formed in the torrefaction process, which inlet orifice for torrefying gas is located at the end of the torrefying chamber that faces the outlet and the outlet orifice is located at the opposite end of the torrefying chamber.

The drying gas and the torrefying gas are both hot gases. The hot drying gas is intended for evaporating residual moisture in the drying chamber, while the hot torrefying gas is intended for heating the almost completely dry material in the torrefying chamber to the required torrefying temperature. Combustible torrefaction gases are formed during the torrefaction process in the torrefying chamber and can be removed through the outlet orifice.

During operation, the material is conveyed through the torrefaction reactor in a transport direction. The material is dried in the drying chamber by the introduction of a hot drying gas into it through one or more inlet orifices in the drying chamber. The hot drying gas flows through the drying chamber in co-current with the material. The torrefaction of the material in the torrefying chamber of the torrefaction reactor is carried out by introducing into it a hot torrefying gas through one or more inlet orifices in the torrefying chamber. The hot torrefying gas flows through the torrefying chamber of the torrefaction reactor in counter-current to the material. The drying gas and the torrefying gas flow towards each other from opposite ends of the torrefaction reactor. These gases meet each other at the outlet orifices located between the drying gas inlet orifices and the torrefying gas inlet orifices. This ensures a gas separation between the drying chamber and the torrefying chamber. The drying chamber and torrefying chamber are located at opposite ends of the gas separation—the gas separation delimits the drying chamber and torrefying chamber with respect to each other. Unlike in the prior art, where the material can be almost fully dried by evaporation of the residual moisture in the torrefaction reactor, the process in the device according to the invention can be split into two stages which can be set in an optimum manner.

When the drying chamber and the torrefying chamber are housed in the torrefaction reactor, the drying chamber and the torrefying chamber form two separate spaces in the same torrefaction reactor. In an alternative embodiment the drying chamber is located e.g. in a residual-moisture dryer, and the torrefying chamber is located in the torrefaction reactor. In this case, the residual-moisture dryer forms a separate entity, which is housed separately with respect to the torrefaction reactor.

It is possible according to the invention to provide a dryer to which a relatively wet material can be supplied, which dryer has heating means to warm this material in order to evaporate moisture from the material until the amount of residual moisture stays in it, and the material dried in the dryer being able to be fed into the drying chamber of the torrefaction reactor. This makes the device according to the invention suitable for handling relatively wet material, for example material with a moisture content of about 15%, 25% or more. The relatively wet material can be thermally pre-dried in the dryer before it is fed into the torrefying chamber.

The device according to the invention can therefore comprise two dryers and a torrefaction chamber. The first drier forms a preliminary dryer that is used to reduce the moisture content to e.g. about 5-15%. The second dryer is formed by the drying chamber in the torrefaction reactor or by the residual-moisture dryer as described above.

In one embodiment of the invention, the torrefaction reactor is bounded by a peripheral wall, the drying chamber and the torrefying chamber extending as a continuation of each other within the peripheral wall. When viewed in the direction of flow of the material, the drying chamber is located between the inlet for material and the torrefying chamber, and the torrefying chamber is located between the drying chamber and the outlet for torrefied material.

In one embodiment of the invention, the torrefaction reactor is mounted in the upright position, a number of inlet orifices being provided in the peripheral wall, one above the other, for drying gas. This torrefaction reactor can be e.g. vertical or it can be erected at an angle. Since these orifices are distributed around the periphery of the peripheral wall, the gas can penetrate to the material which is located centrally within the peripheral wall. The material is given sufficient opportunity for drying over its entire cross section within the peripheral wall.

The material can move from the top downwards within the peripheral wall under the influence of gravity. However, it is also possible for the material to flow through the torrefaction reactor from below upwards. For this purpose a feed device is provided, for example, such as a screw member or a piston which can move up and down within the peripheral wall. The feed device can be located outside the hot peripheral wall of the torrefaction reactor. The thermal load of the feed device is thereby reduced.

In one embodiment of the invention, the outlet is connected to a cooling chamber and the torrefied material can be introduced from the torrefying chamber into the cooling chamber. For example, the feed device pushes the material within the peripheral wall of the torrefaction reactor upwards until the material reaches an overflow part. The torrefied material overbalances along the edge of the overflow part and drops beyond it into the cooling chamber. The cooling chamber is generally provided with inlet orifices for cooling gas. The cooling gas cools the torrefied material.

The invention will now be further explained with reference to an exemplary embodiment illustrated in the figures.

The design of the process and device according to the invention will be described below with the aid of the figures for treating biomass. However, the invention is not limited to biomass but can be applied to all kinds of material. For example, various low-mobility materials, such as non-biodegradable waste, can be treated according to the invention.

The device for treating biomass according to the invention is indicated in its entirety by 1. The device for treating biomass 1 comprises in this embodiment a dryer 3, acting as a preliminary dryer. The dryer 3 has an inlet 5 for the introduction of wet biomass into the dryer 3. The dryer 3 also has an inlet 6 for hot gas, which is at a temperature of e.g. about 80° C.

The hot gas introduced raises the temperature of the biomass in the dryer 3 but does not reduce the moisture content in the biomass at first. This stage is called "pre-warming" in FIG. 2. As the temperature rises, the moisture begins to evaporate from the biomass. When the temperature of the biomass reaches the evaporation temperature, the free and loosely bound water evaporates from the biomass, while the temperature remains virtually constant. This stage is called "pre-drying" in FIG. 2. The biomass is dried in the dryer 3 until about 7-15% residual moisture content remains in it. The pre-dried biomass then leaves the dryer 3 through an outlet 7. Most of the energy of the hot gases introduced is used for drying the biomass, so its own temperature drops to 70-80° C. The cooled gases are removed from the dryer 3 through an outlet 8.

The device 1 for treating biomass also comprises a torrefaction reactor 10. The torrefaction reactor according to the invention has an inlet 11 that is connected to the outlet 7 of the dryer 3. The pre-dried biomass can therefore be introduced into the torrefaction reactor 10 through the inlet 11. The torrefaction reactor 10 also has at least one inlet orifice 12. A hot gas flows through the inlet orifice 12 into the torrefaction reactor 10, so that heat transfer takes place by direct contact between the hot gas and the biomass. However, according to the invention, the torrefaction reactor can also be constructed for an indirect heat exchange between the hot gas and the biomass.

Figure 2:
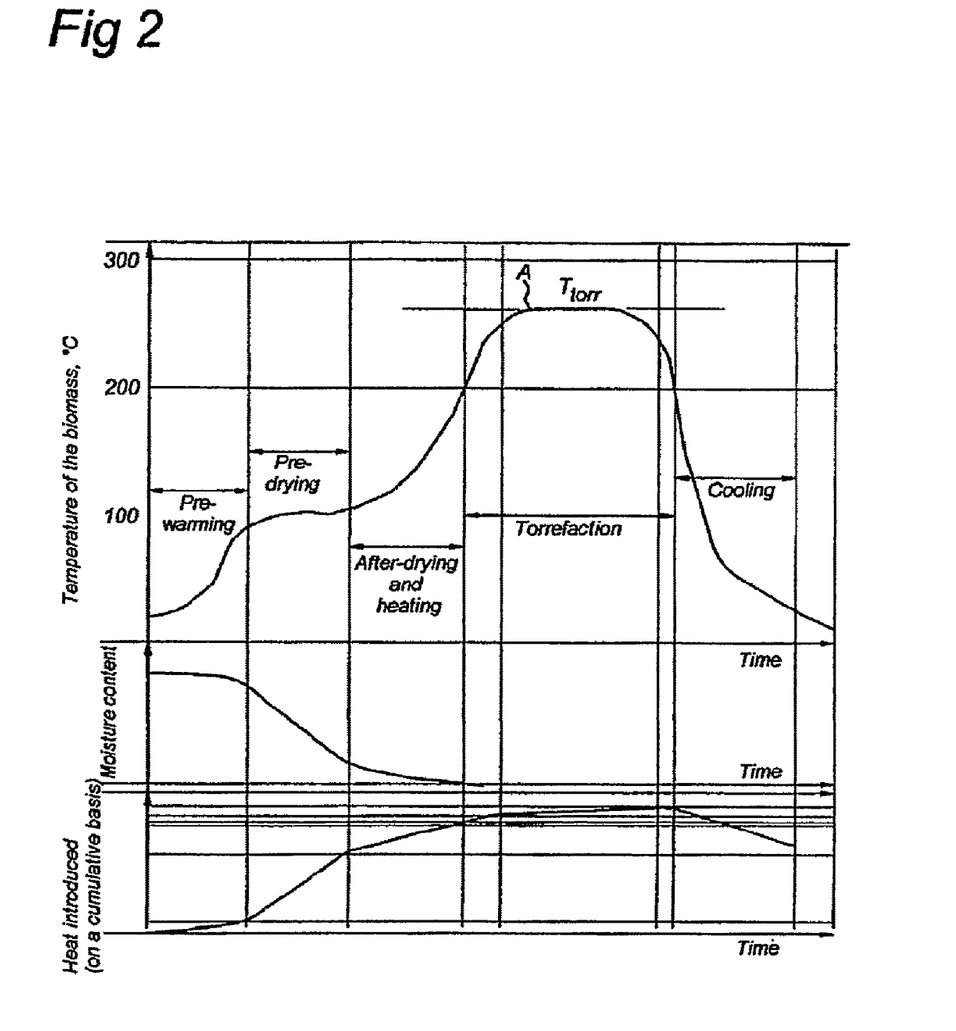
FIG. 2 shows a graph in which the temperature of the biomass, the moisture content of the biomass, and the energy introduced into the process (on a cumulative basis) are plotted against time.

FIG. 2 shows that the temperature of the biomass must first rise before torrefaction can take place. After all, the minimum temperature needed for torrefaction is about 200° C. As the temperature rises, the bound water evaporates from the biomass until the biomass is virtually free of moisture. This stage is called "post-drying and heating" in FIG. 2. This post-drying and heating is carried out according to the invention in a drying chamber of the torrefaction reactor, which will be explained in more detail later with the aid of FIG. 3.

The biomass will then be torrefied (see "torrefaction" in FIG. 2) in a torrefying chamber of the torrefaction reactor. During the torrefaction process, the temperature rises from about 200° C. until a maximum torrefying temperature $T_{torr}$ is reached at point A in FIG. 2. The temperature $T_{torr}$ can be regulated and affects the properties of the biomass fuel. The product quality of the torrefied biomass is reached at point A, but generally not enough combustible torrefaction gases have formed yet. The maximum torrefying temperature $T_{torr}$ is maintained beyond this point A, so that the amount of combustible torrefaction gases increases in the torrefaction reactor 10. The quality of the torrefied biomass is also improved here further. The combustible torrefaction gases leave the torrefaction reactor 10 through at least one outlet orifice 14.

The outlet orifice 14 is connected to a combustion unit 20 with the aid of a pipe 16. The combustion unit 20 has an air inlet 22. The torrefaction gases introduced into the combustion unit 20 burn therein, which gives rise to a very hot flue gas. The flue gas has a temperature, for example, that lies in the range of 1000-1600° C., being e.g. 1200° C. The combustion unit 20 has an outlet 24 for the removal of this flue gas. The combustion unit 20 may also have an inlet 23 for additional fuel. The inlet 23 is desirable for example when the torrefying gases are not combustible or give rise to a flue gas that is not hot enough.

Figure 1:
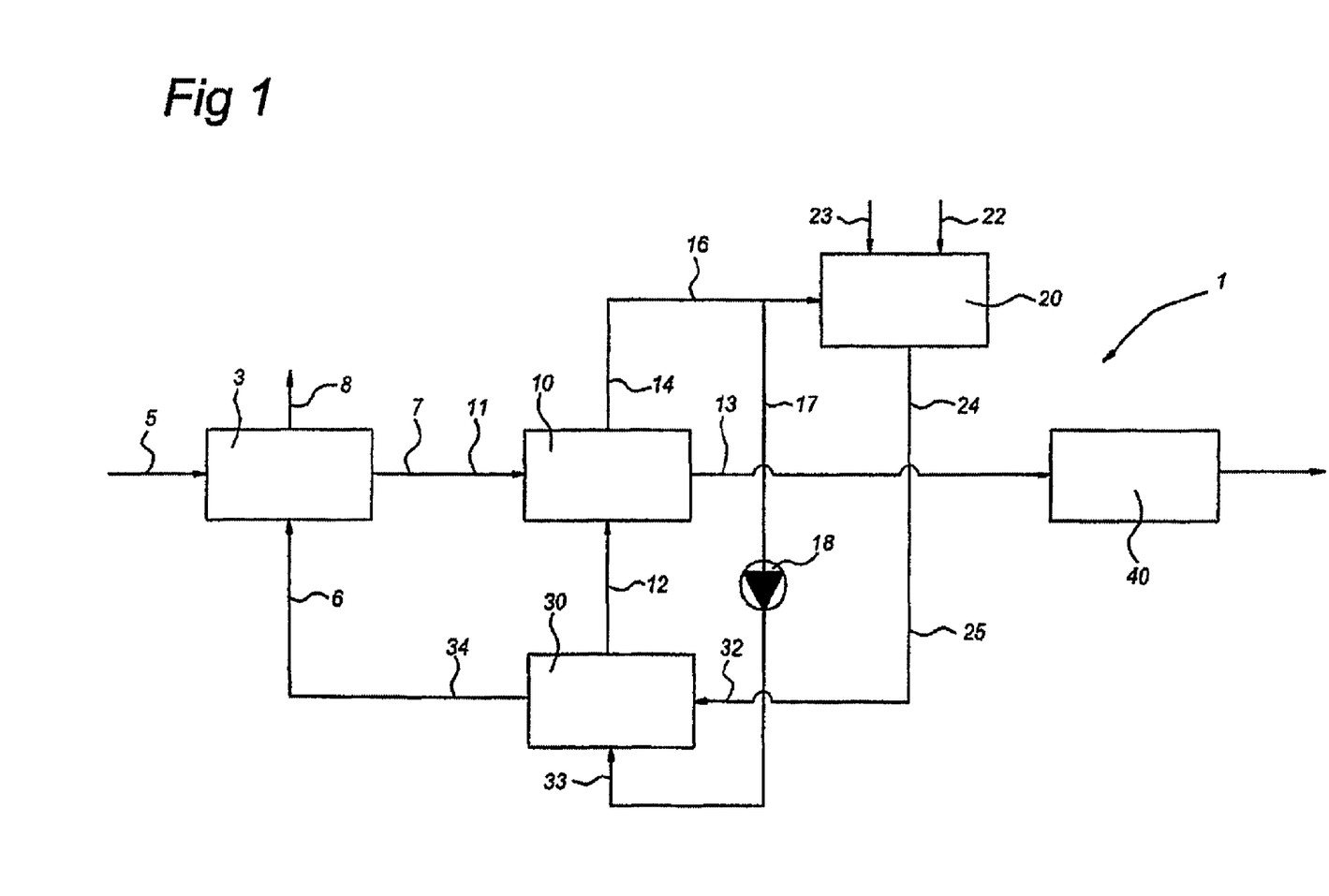
FIG. 1 shows a schematic process flow diagram for the process of treating biomass according to the invention.

The device 1 shown in FIG. 1 for treating biomass also comprises a heat exchanger 30. The heat exchanger 30 has an inlet 32 for hot flue gas, which inlet is connected to the outlet 24 of the combustion unit 20 with the aid of a pipe 25. In addition, the heat exchanger 30 has an inlet 33 for torrefaction gas. From the pipe 16 that connects the torrefaction reactor 10 to the combustion chamber 20, there is a branch line 17 running to the inlet 33 of the heat exchanger 30. A fan 18 is provided in the branch line 17. Therefore, part of the torrefaction gas leaving the torrefaction reactor 10 flows into the heat exchanger 30 through the branch line 17, the fan 18 and the inlet 33. The flue gas entering through inlet 32 raises the temperature of the torrefaction gas to about 200-400° C. As a result of this the flue gas itself cools down to about 500-1000° C. The cooled flue gas then leaves the heat exchanger 30 through outlet 34, which is connected to the inlet 6 of the dryer 3.

The heat exchanger can be either of the direct or the indirect type. In the case of direct heat exchange, the torrefaction gas and the flue gas are in direct contact with each other. In an indirect heat exchanger, the hot flue gas at a temperature of 1000-1600° C. is used to heat e.g. an oil to 250-400° C., and the hot oil then heats up the torrefying gas. After that, this heated torrefaction gas flows into the torrefying chamber through the inlet orifice 12.

The torrefied biomass is removed from the torrefaction reactor 10 through an outlet 13. The torrefied biomass is then conveyed to a cooler 40, where the biomass can cool down to room temperature. This is indicated by "cooling" in FIG. 2.

Figures 3, 4:
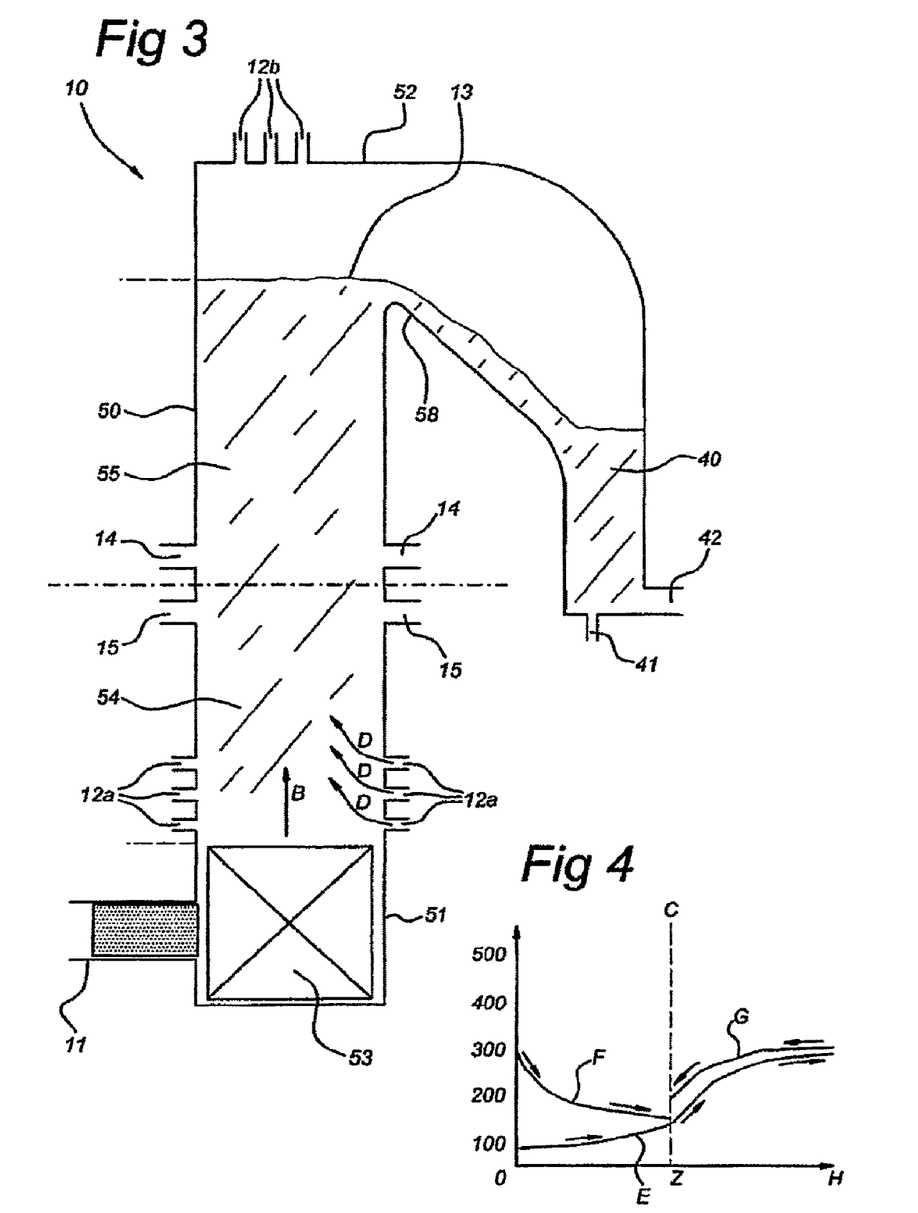
FIG. 3 shows a view in cross section of a torrefaction reactor according to the invention.
FIG. 4 shows a graph in which the temperature of the drying gas, the torrefying gas, and the biomass are plotted against the vertical distance in the torrefaction reactor.

Although FIG. 1 shows the torrefaction reactor 10 schematically in the form of a single block diagram, the torrefaction reactor 10 according to the invention comprises at least two reactor spaces. The first reactor space provides the drying chamber, while the second reactor space forms the torrefying chamber. The torrefaction reactor 10 according to the invention is shown in FIG. 3 in more detail.

The torrefaction reactor 10 is essentially in the vertical position when it is in operation. The torrefaction reactor 10 comprises a peripheral wall 50, a bottom section 51 and a top section 52. The inlet 11 for introducing biomass into the torrefaction reactor 10 is located at one side of the bottom section 51. The bottom section 51 comprises a feed device 53 for conveying the biomass upwards within the peripheral wall 50. The feed device 53 is shown schematically in FIG. 3. The peripheral wall 50 in the torrefaction reactor is filled with biomass during operation.

The feed device 53 can have various designs. For example, the feed device comprises two pistons and a supporting valve. The first piston can move through the inlet 11 to push in biomass for the second piston, which can move up and down within the peripheral wall. The supporting valve can move between a supporting position and a free position. When the piston has reached the end of its stroke, the supporting valve moves over to the supporting position to support the biomass within the peripheral wall. The second piston can then move downwards, after which the first piston can again load a quantity of biomass on it. However, the feed device can also be designed as a conveyer screw. The design of the feed device 53 depends on the orientation of the torrefaction reaction, which can be essentially vertical, horizontal or inclined at an angle between the two.

Within the peripheral wall 50, the torrefaction reactor 10 is divided into a first reaction space or drying chamber 54 for the evaporation of residual moisture from the biomass, and a second reaction space or torrefying chamber 55 for torrefaction of the biomass. In this exemplary embodiment, there is no physical separation between the drying chamber 54 and the torrefying chamber 55 and the reaction spaces 54 and 55 are continuous. The transition between the reaction spaces 54 and 55 is indicated by the dashed line C. In this exemplary embodiment, the drying chamber 54 and the torrefying chamber 55 are therefore not enclosed chambers but form a continuous drying space 54 and torrefying space 55.

The drying chamber 54 is therefore located between the biomass inlet 11 and the torrefying chamber 55. The drying chamber 54 has a number of inlet orifices 12a for the introduction of a hot drying gas. The drying gas introduced comes from the heat exchanger 30 (see FIG. 1) and has a temperature of e.g. 100-400° C. The drying gas and the biomass move in co-current with each other in the drying chamber 54.

Since a number of inlet orifices 12a are placed one over the other the drying gas can penetrate to the biomass at the location of the core within the peripheral wall. The drying gas that is introduced through the top inlet orifice 12a forms a stream of hot gas along the inside of the peripheral wall 50. Owing to this flow, the drying gas that has been introduced through the inlet orifice 12a below the first one is forced to move away from the peripheral wall 50 and is directed radially inward. This is indicated schematically by the arrows D. This ensures that not only the biomass by the peripheral wall but also the biomass in the middle is able to dry fully.

Steam is generated during the drying of the biomass in the drying chamber 54. Part of this steam and the drying gas cooled by evaporation leaves the torrefaction reactor 10 through outlet orifices 15, located sideways in the peripheral wall 50. The steam produced is preferably largely passed into the torrefying chamber 55 of the torrefaction reactor 10, because the steam generally contains a considerable amount of organic compounds.

When the biomass surpasses the level indicated by the dashed line C, the biomass is almost fully dry, i.e. the residual moisture has almost completely evaporated from the biomass. The moisture content of the biomass is then preferably ≦3%. The temperature of the biomass has risen to about 200° C. at the same time. Therefore, what happens above the level shown by the dashed line C is torrefaction. The biomass is then located in the torrefying chamber 55 for torrefying the biomass.

The torrefying chamber 55 has inlet orifices 12b for torrefying gas, which are located in the top section 52 of the torrefaction reactor 10. The torrefying gas is the hot gas introduced into the torrefying chamber to torrefy the biomass. The torrefying gas is derived from the heat exchanger 30 (see FIG. 1), just like the drying gas. The torrefying gas flows from the inlet orifices 12b downwards through the biomass. The torrefying gas moves in counter-current to the biomass. In the second reaction space 55, the biomass is torrefied as it moves upward. As the biomass is heated to the maximum torrefying temperature $T_{torr}$, combustible torrefaction gases are formed in the second reaction space 55. The amount of combustible torrefaction gas increases by maintaining this temperature for some time. The torrefying gas introduced and the torrefaction gases formed leave the second reaction space 55 through outlet orifices 14.

The gas mixture leaving the torrefaction reactor 10 through the outlet orifices 14 will therefore contain relatively little steam according to the invention. The flow in the pipe 16 and the branch line 17 (see FIG. 1) is therefore relatively limited, which reduces the required power of the fan 18. Furthermore, the discharged combustible torrefaction gas will be hardly diluted with steam from the drying chamber 54, if at all. This has a favourable effect on the burning properties in the combustion unit 20 (see FIG. 1).

The torrefaction reactor 10 has an overflow part 58. As the torrefied biomass is pushed over the edge of the overflow part 58, it overbalances along the overflow part 58 and falls into the cooling unit 40. The cooling unit has an inlet orifice 41 for the introduction of cooling gas. The temperature of the torrefied biomass decreases to room temperature in the cooling chamber 40. The cooled biomass leaves the cooling unit 40 through the outlet 42.

FIG. 4 shows the temperature of the biomass, the drying gas and the torrefying gas as a function of the height z inside the torrefaction reactor (see FIG. 3). The temperature of the biomass is shown by the lowest line E, while the temperature of the drying gas and the temperature of the torrefying gas are shown by lines F and G, respectively. The separation between the drying chamber 54 and the torrefying chamber 55 is again shown by a dashed line C.

FIG. 4 refers to the process according to the invention as described in the case of FIG. 3. The biomass and the drying gas move in the drying chamber 54 in co-current with each other. As a result, the residual moisture can be eliminated from the biomass quickly and efficiently. In the torrefying chamber 55, the biomass and the torrefying gas introduced move in counter-current to each other. This makes it possible to control the maximum torrefying temperature accurately.

Figure 5:
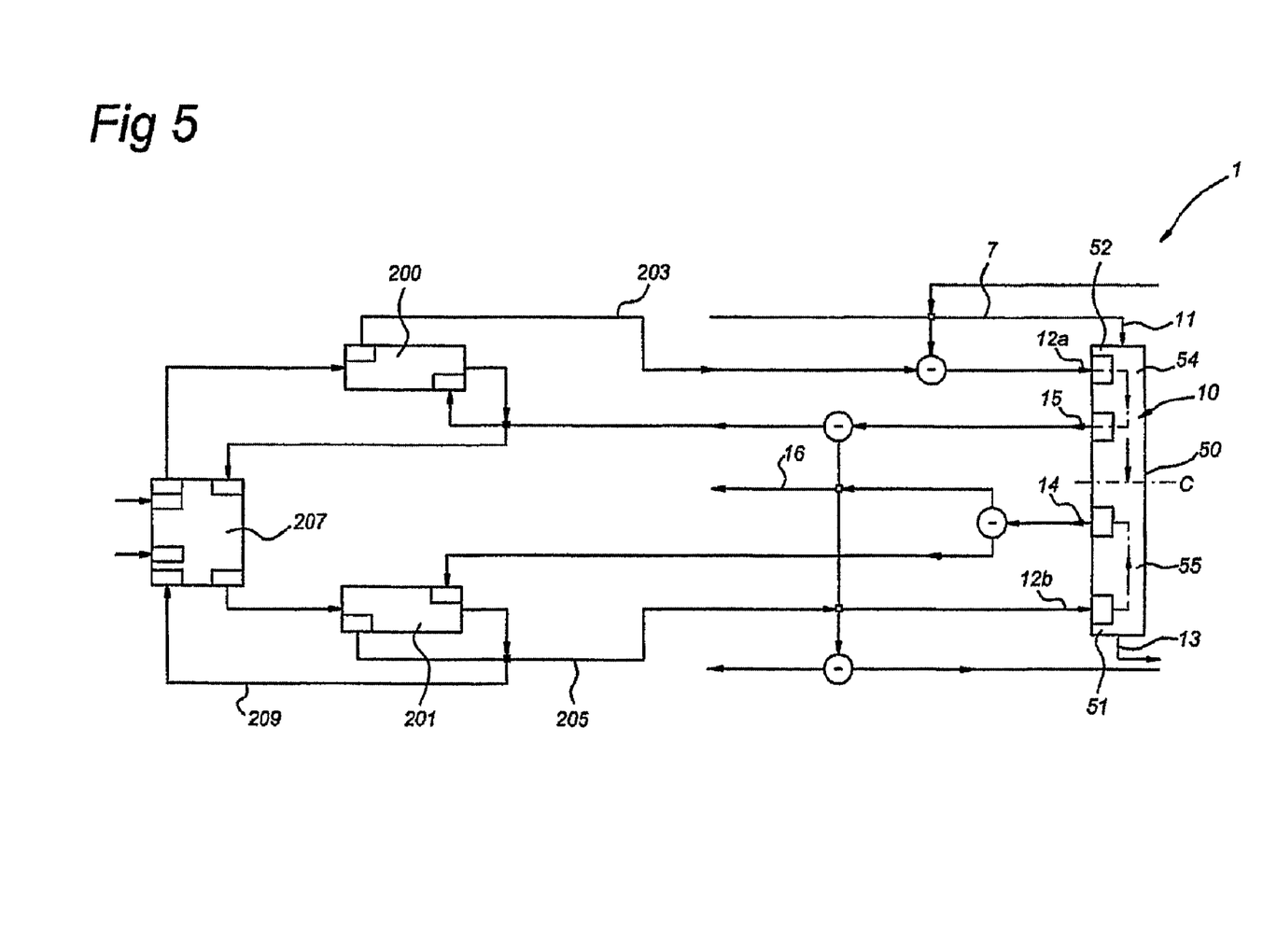
FIG. 5 shows a schematic process diagram in the case of a second embodiment of a process for treating biomass according to the invention.

FIG. 5 shows a second embodiment of a device for treating biomass, where the same reference numerals denote the same parts. The operation and construction essentially corresponds to the process and device for treating biomass as described above, and this embodiment also has the advantages mentioned above. The embodiment illustrated in FIG. 5 will be described below further as follows.

The dryer used for pre-drying the biomass is not shown in FIG. 5. The biomass, whether pre-dried or not, is introduced into the torrefaction reactor 10 through the inlet 11. The torrefaction reactor 10 is essentially vertical. Within the peripheral wall 50, the biomass moves downward under the influence of gravity. After all, the inlet 11 is located in the top section 52 of the torrefaction reactor 10, while the outlet 13 is in its bottom section 51.

The top section of the torrefaction reactor 10 forms the drying chamber 54, while the bottom section of the torrefaction reactor 10 defines the torrefying chamber 55. The drying chamber 54 is located between the biomass inlet 11 and the torrefying chamber 55. The torrefying chamber 55 is bounded between the drying chamber 54 and the biomass outlet 13.

The drying chamber 54 has one or more inlet orifices 12a. A hot drying gas flows into the drying chamber 54 of the torrefaction reactor 10 through the inlet orifices 12a, so that heat transfer takes place by direct contact between the hot drying gas and the biomass. However, the drying chamber can also be designed according to the invention for indirect heat exchange between the hot drying gas and the biomass. The drying gas and the biomass move in the drying chamber 54 in co-current with each other. Preferably a number of inlet orifices 12a are provided, one above the other, so that the drying gas can penetrate to the biomass at the location of the core (not shown in FIG. 5).

The hot drying gas raises the temperature of the biomass in the drying chamber 54 and evaporates the bound water from the biomass until the biomass is almost free of moisture. This stage is indicated in FIG. 2 by "post-dying and heating". The hot drying gas is cooled in the process. The cooled drying gas, and possibly the gas and/or vapour formed in the evaporation of residual moisture, leave the drying chamber 54 through the outlet orifices 15. The cooled drying gas is then introduced into a first heat exchanger 200. The first heat exchanger 200 heats the drying gas, and this heated drying gas is then again introduced into the drying chamber 54 through the inlet orifices 12a. This forms a first circuit 203, in which the drying gas circulates.

The biomass descends from the drying chamber 54 into the torrefying chamber 55 of the torrefaction reactor, i.e. the biomass surpasses the level indicated by the dashed line C. The biomass is then almost completely dry, i.e. the residual moisture has been almost fully evaporated from the biomass. The biomass now contains e.g. ≦3% of moisture. The temperature of the biomass will have risen to about 200° C. at the same time.

A hot torrefying gas is passed into the torrefying chamber 55 through the inlet orifices 12b. The torrefying gas is the hot gas that is introduced into the torrefying chamber 55 to torrefy the biomass. The torrefying gas moves from the inlet orifices 12b upward through the biomass. The torrefying gas and the biomass move in counter-current to each other. In the second reaction space 55, i.e. below the level indicated by the dashed line C, the biomass will be torrefied as it moves downward.

Combustible torrefaction gases are formed when the biomass is heated to the maximum torrefying temperature $T_{torr}$ in the second reaction space 55. The amount of combustible torrefaction gas increases by maintaining this temperature for some time. The torrefying gas introduced and the torrefaction gases formed leave the torrefying chamber 55 through the outlet orifices 14.

The outlet orifices 14 are connected to the pipe 16 with the aid of a branch line, and pipe 16 is connected to a combustion unit 20 (not shown in FIG. 5). The outlet orifices 14 are likewise connected to a second beat exchanger 201, and part of the torrefaction gas formed is passed into the second heat exchanger 201. The heat exchanger 201 heats up the torrefaction gas, and the heated torrefaction gas is introduced into the torrefying chamber 55 through the inlet orifices 12b. In this exemplary embodiment, the torrefaction gas formed is used as the torrefying gas. This gas is recirculated in a second circuit 205.

The temperature profile shown in FIG. 4 also applies to the embodiment illustrated in FIG. 5. The biomass and the drying gas move in the drying chamber 54 in co-current with each other. As a result the residual moisture can be eliminated from the biomass quickly and efficiently. In the torrefying chamber 55 the biomass and the torrefying gas supplied move in counter-current to each other. This makes it possible to control the maximum torrefying temperature accurately.

The heating of the drying gas and the torrefying gas in the respective heat exchangers 200 and 201 can be carried out with the aid of a third circuit 209, which comprises a heating unit 207. The heating unit 207 can be e.g. an oil boiler, in which case hot oil is circulated in the third circuit 209, including the heat exchangers 200 and 201. This is made possible by the use of a co-current flow in the drying chamber 54 and a counter-current flow in the torrefying chamber 55, in which case the temperatures of the drying gas and the torrefying gas remain relatively low.

The torrefied biomass is removed from the torrefaction reactor 10 through the outlet 13. The torrefied biomass is then transferred to a cooler 40 (not shown in FIG. 5), where the biomass can be cooled down to room temperature. This is indicated in FIG. 2 by "cooling".

The invention is of course not restricted to the embodiments described above. On the basis of known processes, for example, the expert will be able to introduce various modifications within the scope of the invention. For example, the drying chamber 54 and the torrefying chamber 55 can be made as separate entities, connected to each other by a pipe. The drying chamber 54 is then housed in a separate residual-moisture dryer, while the torrefying chamber 55 is incorporated in the torrefaction reactor 10. In this case, the residual-moisture dryer in the system illustrated in FIG. 1 is inserted between the preliminary dryer 3 and the torrefaction reactor 10. There is then also a physical separation between the drying chamber 54 and the torrefying chamber 55, unlike in the embodiment shown in FIG. 3.

The invention claimed is:

1. A process for treating a material having biomass or waste product, the process comprising:
provision of the material that contains an amount of residual moisture,
provision of a torrefaction reactor,
heating of the material in the torrefaction reactor to a torrefying temperature in a low-oxygen atmosphere in the torrefaction reactor, wherein the material is converted into a torrefied material,
in which the material with the amount of residual moisture is essentially fully dried in a drying chamber by evaporation of the amount of residual moisture, and the torrefaction of the dried material is essentially carried out in a torrefying chamber of the torrefaction reactor, and the material is conveyed through the torrefaction reactor in a transport direction, and the drying of the material in the drying chamber is carried out by introducing into the material a hot drying gas that flows through the drying chamber in co-current with the transport direction of the material, and the torrefaction of the material in the torrefying chamber of the torrefaction reactor is carried out by introducing into the material a hot torrefying gas that flows through the torrefying chamber of the torrefaction reactor in counter-current to the transport direction of the material.

2. The process according to claim 1, wherein the torrefaction reactor comprises the drying chamber and the torrefying chamber.

3. The process according to claim 1, wherein the drying chamber is housed in a residual-moisture dryer, and the torrefying chamber is housed in the torrefaction reactor.

4. The process according to claim 1, wherein the material contains solid particles that move through the torrefaction reactor in the form of a packed moving bed.

5. The process according to claim 1, wherein the drying gas, after it has being moved in co-current with the transport direction of the material and has thus been cooled, leaves the drying chamber and is introduced into a first heat exchanger, which heats up the drying gas, after which the drying gas, heated up by the first heat exchanger, is introduced into the drying chamber, and the torrefying gas, after being moved in counter-current to the transport direction of the material and has thus been cooled down, leaves the torrefying chamber and is introduced into a second heat exchanger, which heats up the torrefying gas, after which the torrefying gas that has been heated up by the second heat exchanger is introduced into the torrefying chamber.

6. The process according to claim 1, wherein the provision of the material comprises introducing a relatively wet raw material into a dryer, and heating the relatively wet raw material in the dryer to evaporate moisture from the relatively wet raw material until the amount of residual moisture remains, the material that has been dried in the dryer being introduced into the drying chamber.

7. The process according to claim 1, wherein the temperature of the hot torrefying gas introduced into the torrefying chamber is in the range of 200-400° C.

8. The process according to claim 7, wherein the temperature of the hot torrefying gas introduced into the torrefying chamber is about 300° C.

9. The process according to claim 1, wherein the temperature of the hot drying gas introduced into the drying chamber is in the range of 150-600° C.

10. The process according to claim 9, wherein the temperature of the hot drying gas introduced into the drying chamber is about 350° C.

11. A device for treating a material having biomass or waste product, the device comprises a torrefaction reactor that can be fed with material that contains an amount of residual moisture, which torrefaction reactor is provided with an inlet for introducing the material into the torrefaction reactor, heating means for heating the material in the torrefaction reactor to a torrefying temperature, air-treating means for creating a low-oxygen atmosphere in the torrefaction reactor where the material can be converted into torrefied material during operation, and an outlet for removing the torrefied material, in which the torrefaction reactor comprises a drying chamber and a torrefying chamber, which drying chamber is adapted for essentially complete drying of the material containing the amount of residual moisture by evaporating the amount of residual moisture and which torrefying chamber is adapted for torrefying the dried material, and wherein the torrefying chamber is located downstream of the drying chamber when viewed in a direction of flow of the material through the torrefaction reactor, and wherein the drying chamber has at least one inlet orifice for drying gas and at least one outlet orifice for said drying gas and possibly gas and/or vapour formed during evaporation of the amount of residual moisture, which the at least one inlet orifice for drying gas is located at an end of the drying chamber that faces the inlet for introducing the material into the torrefaction reactor, and the outlet orifice is located at an opposite end of the drying chamber, and wherein the torrefying chamber has at least one inlet orifice for torrefying gas and at least one outlet orifice for said torrefying gas and processed torrefaction gas formed in the torrefaction process, which the at least one inlet orifice for the torrefying gas is located at an end of the torrefying chamber that faces the outlet for removing the torrefied material and the at least one outlet orifice is located at an opposite end of the torrefying chamber.

12. The device according to claim 11, further comprising first and second heat exchangers, wherein the first heat exchanger is provided for heating the drying gas and is connected to the inlet orifice and the outlet orifice of the drying chamber in order to form a drying gas circuit, and the second heat exchanger is provided for heating the torrefying gas and is connected to the inlet orifice and the outlet orifice of the torrefying chamber to form a torrefying gas circuit.

13. The device according to claim 11, further comprising a dryer provided to be fed with the material, in which the material is relatively wet, the dryer being fitted with heating means for heating the relatively wet material in order to evaporate moisture from the relatively wet material until the amount of residual moisture remains, and wherein the dryer is connected to the drying chamber for introducing the material dried in the dryer into the drying chamber.

14. The device according to claim 11, wherein, when viewed in the direction of flow of the material, the drying chamber is located between the inlet for introducing the material into the torrefaction reactor and the torrefying chamber, and the torrefying chamber is located between the drying chamber and the outlet for removing the torrefied material.

15. The device according to claim 11, wherein the torrefaction reactor is bounded by a peripheral wall, and the drying chamber and the torrefying chamber extend as a continuation of each other within the peripheral wall.

16. The device according to claim 15, wherein the torrefaction reactor is mounted in an upright position, and wherein a plurality of said at least one inlet orifice is provided in the peripheral wall, one above the other, for introduction of the drying gas.

17. The device according to claim 11, wherein the outlet for removing the torrefied material is connected to a cooling chamber, and wherein the torrefied material can be introduced from the torrefying chamber into the cooling chamber.

18. The device according to claim 17, wherein the cooling chamber is provided with inlet orifices for introduction of cooling gas.

* * * * *